US011578387B2

(12) United States Patent
Volakakis

(10) Patent No.: US 11,578,387 B2
(45) Date of Patent: Feb. 14, 2023

(54) CHEMICAL PROCESS FOR THE RECOVERY OF ALKALINE AND ZINC-CARBON BATTERY COMPONENTS

(71) Applicant: EVH S.R.L. IN LIQUIDAZIONE, Milan (IT)

(72) Inventor: Emmanouil Volakakis, Lainate (IT)

(73) Assignee: EVH S.R.L. IN LIQUIDAZIONE, Milan (IT)

( * ) Notice: Subject to any disclaimer, the term of this patent is extended or adjusted under 35 U.S.C. 154(b) by 142 days.

(21) Appl. No.: 16/643,106

(22) PCT Filed: Sep. 4, 2018

(86) PCT No.: PCT/EP2018/073709
§ 371 (c)(1),
(2) Date: Feb. 28, 2020

(87) PCT Pub. No.: WO2019/043244
PCT Pub. Date: Mar. 7, 2019

(65) Prior Publication Data
US 2020/0347481 A1 Nov. 5, 2020

(30) Foreign Application Priority Data

Sep. 4, 2017 (EP) .................................... 17189198

(51) Int. Cl.
| C22B 19/30 | (2006.01) |
| C22B 1/00 | (2006.01) |
| C22B 3/44 | (2006.01) |
| C22B 7/00 | (2006.01) |
| C22B 47/00 | (2006.01) |
| H01M 6/52 | (2006.01) |

(52) U.S. Cl.
CPC .............. *C22B 19/30* (2013.01); *C22B 1/005* (2013.01); *C22B 3/44* (2013.01); *C22B 7/007* (2013.01); *C22B 47/00* (2013.01); *H01M 6/52* (2013.01)

(58) Field of Classification Search
None
See application file for complete search history.

(56) References Cited

U.S. PATENT DOCUMENTS

2020/0347481 A1* 11/2020 Volakakis ............... C22B 7/007
2021/0135250 A1* 5/2021 Howe .................... H01M 4/505
2021/0162617 A1* 6/2021 Volakakis ............... H01M 6/06

FOREIGN PATENT DOCUMENTS

| EP | 0795919 B1 | 9/1997 |
| EP | 1132992 B1 | 9/2001 |
| WO | 00/08700 A1 | 2/2000 |

OTHER PUBLICATIONS

Ubaldine, S. et al, "Hydrometallurgical treatment of exhausted alkaline batteries", Mineralia Slovace,vol. 42, 2010, p. 361-364.
Ferella, F. et al, "Recovery of Zince and Manganese From Spent Batteries by Different Leaching Systems", ACTA Metallurgica Slovaca,vol. 12, 2006, p. 95-104.
Ferella F et al, "Process for the recycling of alkaline and zinc-carbon spent batteries", Sep. 1, 2008 (Sep. 1, 2008), vol. 183, No. 2, p. 805-811.
De Michelis et al, "Recovery of zinc and manganese from alkaline and zinc-carbon spent batteries", Journal of Power Sources, Elsevier SA, CH,vol. 172, No. 2, Sep. 28, 2007 (Sep. 28, 2007), p. 975-983.
Da Silva, R.G. et al., "Recovery of Manganese and Zinc From Spent Zn—C and Alkaline Batteries in Acidic Medium", Quim. NOVA,vol. 33, No. 9, 2010, p. 1957-1961.
International Search Report, dated Oct. 28, 2018 for corresponding PCT patent application No. PCT/EP2018/073709.
Written Opinion of the International Searching Authority, dated Oct. 28, 2018 for corresponding PCT patent application No. PCT/EP2018/073709.

* cited by examiner

*Primary Examiner* — Scott R Kastler
(74) *Attorney, Agent, or Firm* — Leason Ellis LLP

(57) ABSTRACT

A process is described for the recovery of the chemical components of the "black paste" resulting from the opening of dead alkaline and zinc-carbon batteries.

14 Claims, No Drawings

CHEMICAL PROCESS FOR THE RECOVERY OF ALKALINE AND ZINC-CARBON BATTERY COMPONENTS

CROSS REFERENCE TO RELATED APPLICATIONS

This application is a national phase of PCT application No. PCT/EP2018/073709, filed Sep. 4, 2018, which claims priority to EP patent application No. 17189198.9, filed Sep. 4, 2017, all of which are incorporated herein by reference thereto.

FIELD OF THE INVENTION

The present invention relates to a chemical process for the recovery of alkaline and zinc-carbon battery components.

PRIOR ART

The huge spread of portable electrical and electronic products requires the availability of discrete sources, i.e. free-standing units, capable of delivering electricity.

These discrete current sources are mainly divided into primary batteries, or cells, and secondary batteries, or storage batteries. The first ones work based on an oxidoreduction reaction that occurs between two components thereof and generates an electron transfer that, properly channeled, gives rise to the required current flow. Secondary batteries are instead rechargeable batteries (such as the widespread lithium batteries).

While secondary batteries (accumulators) have a relatively long life and may be subjected to hundreds of recharge cycles before needing to be replaced, the actual batteries (primary batteries) must be discarded after one cycle of life. Considering the very high production volumes and the contents of chemical species potentially harmful to the environment, batteries pose significant problems of disposal.

Although there are many types of batteries based on different oxide-reductive systems, the vast majority of these (about 90% of the market) are zinc-carbon and alkaline, which is an evolution of zinc-carbon; in particular, currently about 75-80% of the market consists of alkaline batteries, while 10-15% of zinc-carbon ones. These batteries are used in applications such as flashlights, toys, various electrical and electronic tools.

In both types of batteries, the generation of the electron flow is determined by a reduction reaction of manganese (IV) dioxide, $MnO_2$, and concomitant oxidation of metallic zinc to $Zn^{2+}$ion.

In zinc-carbon batteries, zinc (anode) is the basis and the cylindrical wall of the enclosure, while manganese dioxide is embedded in a gelatinous paste also comprising ammonium chloride and coal powder.

In alkaline batteries, zinc is instead present in the form of powder around the anode consisting of a metal rod; $MnO_2$ and Zn powders are surrounded by a gelatinous paste of potassium hydroxide (KOH) which acts as the electrolyte, and hence the name "alkaline" of these batteries.

The paste in these batteries is defined "black paste" in the field.

The recovery and recycling of zinc-carbon (hereinafter also referred to as Zn-C) and alkaline battery components is the subject of numerous studies and publications.

Battery recycling procedures involve a series of operations.

First, the batteries must be separated by type.

The first separation is dimensional, and allows a first, very coarse separation of the batteries according to the type of chemical components, since smaller batteries are generally not Zn-C or alkaline type; for example, they may be silver or mercury batteries, although the latter type has now almost completely fallen into disuse due to the regulations of most countries. This first separation may be carried out by a simple passage on belts or vibrating tables with appropriate size openings increasing along the feeding direction of the batteries.

A second separation is more specifically linked to the chemical nature of the batteries. This type of separation can be carried out as a function of the density thereof, as described for example in International Patent Application WO 00/08700 A1. The most common method, however, is based on X-ray imaging techniques which recognize the internal structure of the battery (for example, the arrangement of the electrodes, which can vary with the type of the batteries), as described for example in patents EP 795 919 B1 and EP 1132992 B1; some recycling facilities also include a manual separation, made by human operators, for batteries that automated systems are not able to assign with certainty to a specific type.

After the separation into groups of homogeneous batteries by chemical type, which ensures the presence only of alkaline or zinc-carbon component materials, the components of the black pastes must then be extracted from these. According to the prior art, in some cases, the batteries are ground for the extraction, or alternatively, the same can be opened in mechanized cutting stations; subsequently, the particulate matter obtained by grinding or the parts obtained by cutting are washed or immersed in water or water-based solutions, which lead to the dissolution or suspension of the components of the black paste in the liquid phase.

At this stage, or immediately afterwards, the components that are not part of the black paste must be separated from the solution, such as steel which constitutes the enclosure of the batteries or plastic materials which form coatings or seals of the same. These materials are washed in different ways to detach the black paste residues.

The liquid phase thus obtained, containing the components of the black paste in solution or in suspension, must then be subjected to chemical processes for the chemical recovery of said components in the same form in which they were present in the black paste or, after appropriate chemical transformations, in a form of easier manageability or more useful to be sent to subsequent recycling stages or direct reuse.

The main problem encountered with the prior art systems is that the mixture of materials obtained after the opening or grinding of the batteries is separated only in a very coarse manner, so that what would be sent to the chemical recycling treatments is a mixture of unknown composition, variable from one process cycle to another (even within the same plant), and which therefore does not allow an effective chemical treatment. For these reasons, almost all of the recycling processes of batteries are pyrometallurgical; that with high energy and environmental costs (emissions and waste).

The object of the present invention is to provide an environmentally friendly and economically viable process, which enables a more effective recovery of components of the black paste of alkaline or zinc-carbon batteries.

SUMMARY OF THE INVENTION

This object is achieved with the present invention with a chemical treatment process of the black paste resulting from previous treatments of separation by type, and opening and separation of materials of alkaline or zinc-carbon batteries, which comprises the following steps:

a) cutting zinc-carbon or alkaline batteries or mixtures thereof, with selective dry extraction of black paste;

b) washing the black paste with water to separate the potassium hydroxide of the alkaline batteries and the ammonium chloride of zinc-carbon batteries in the form of a solution, and recovering the black paste fraction that is insoluble in water;

c) treatment of the wet black paste resulting from step b) with an aqueous solution of sulfuric acid, achieving the solubilisation of metallic zinc and of its compounds and of manganese compounds, and the salification of the residual potassium hydroxide with the formation of potassium sulfate;

d) separating the insoluble residue of black paste consisting of manganese dioxide and carbon from the sulfuric solution;

e) treating the sulfuric solution obtained in step d) with oxalic acid in sub-stoichiometric amounts compared to zinc, obtaining the precipitation of zinc oxalate;

f) separation of zinc oxalate from the sulfuric solution;

g) electrolysis of the acid solution with formation of $MnO_2$ at the anode.

The process of the invention allows recovering at least zinc oxalate and electrolytic manganese dioxide; both of these compounds are recyclable raw materials. As process products, in some variants thereof, other compounds useful for various industrial or agricultural applications are also recovered.

DETAILED DESCRIPTION OF THE INVENTION

In the following description, reference is made to various solutions prepared in the course of the process of the invention; in some cases, it is indicated that these solutions contain salts, such as in the case of potassium sulfate which, however, as is known, are completely soluble in water; consequently, when the presence in solution of notoriously soluble salts is indicated hereinafter, it is meant that the solution contains as main constituents the ions constituting said salts, and that the latter may be precipitated from the solution by concentration thereof.

The process of the invention is best applied if the treated cells are of a single type, and in particular only of the alkaline type (the alternative, the treatment of Zn-C batteries alone, is industrially less interesting due to their smaller diffusion compared to alkaline ones); however, the process can also be implemented on a mixture of alkaline and Zn-C batteries deriving from differentiated collection, which statistically comprises about 80 to 90% of alkaline batteries.

In the first embodiment thereof, the process of the invention comprises a series of operations which enables the effective and quantitative recovery of the black paste components of Zn-C and alkaline batteries in view of their recycling in subsequent productions.

The first step of the process, a), consists in the longitudinal cutting of the batteries and passage of the two halves thus obtained on a vibrating screen, which causes the leakage of the black paste from the open battery enclosure; the particular mode of opening of the batteries and extraction of the black paste by vibrating screen is described in the patent application "Station for cutting AA, D and/or C type batteries, process for the separation and recovery of components of said batteries and plant for carrying out such a process" filed concurrently with the present application. By operating in this way, it is possible to recover the black paste alone, without carrying in the subsequent operations residues of the other parts of the batteries, such as electrodes, parts of the metal enclosure or parts of organic fraction (paper and plastic) generally present on the outside of the batteries; this allows carrying out the subsequent chemical treatments with high efficacy.

The next step, b), consists in the neutral washing of the black paste thus extracted with water between room temperature and 50° C., under constant stirring. In this way, potassium hydroxide (KOH) deriving from the alkaline batteries (and possibly ammonium chloride, $NH_4Cl$, of Zn-C batteries, but in much smaller amounts than KOH), is solubilized. The amount of water required for this operation is generally between about 500 and 1000 liters, preferably between 700 and 800 liters, per 100 kg of black paste.

The resulting solution is separated from the water-insoluble fraction by physical methods, such as by centrifugation or preferably by filtration on filter press.

The fraction of black paste not solubilized in the previous step, washed and still wet, is then processed, in step c) with a solution of sulfuric acid having a concentration of between 5 and 15% by weight, preferably of about 8% by weight; the sulfuric acid solution is used in amounts of between 1200 and 2000 liters, preferably about 1500 liters, for initial 100 kg of black paste, at a temperature between room temperature and 40° C., under constant stirring. In this operation, the dissolution of manganese oxides MnO and $Mn_2O_3$ formed from the dioxide, $MnO_2$ during operation of the battery is accomplished; the metallic zinc (present in powder form in alkaline batteries and as fragments of shell enclosure of Zn-C batteries) and compounds of the element, such as oxide or hydroxide (ZnO and $Zn(OH)_2$) are also solubilized; and any residues of potassium hydroxide left in traces from step b) is also solubilized, forming potassium sulfate ($K_2SO_4$).

The solid residue of this treatment is an insoluble part, consisting of $MnO_2$, graphite electrodes (or the coal powder of Zn-C batteries), in addition to residues of the elements that in the initial battery separate the cathodic component from the anodic one. This solid is the main by-product of the process.

Step d) consists in separating the sulfuric solution from this insoluble residue, preferably by filtration (filter press).

In step e), the sulfuric solution obtained in the previous step is treated with oxalic acid; oxalic acid ($C_2H_2O_4$, used preferably in the form of the dihydrate thereof, $C_2H_2O_4 \cdot 2H_2O$) is used in a slightly understoichiometric amount with respect to the amount of zinc ion present in the solution; the purpose of employing at this stage a slightly lower amount of oxalic acid than what would be required by the stoichiometry of the reaction with zinc is to ensure that an even slight excess of oxalic acid is avoided, which in the acidic solution would react with manganese, leading to a loss of yield in the recovery of the element and to a pollution of the zinc oxalate with manganese oxalate. The concentration of zinc ions in this solution, the knowledge of which is essential to determine the amount of oxalic acid to be used, is derived by atomic emission spectroscopy analysis with ICP source. Zinc oxalate dihydrate, $ZnC_2O_4 \cdot 2H_2O$, is an insoluble salt which precipitates from the solution and can then be recovered by filtration in the subsequent step, f), of separation of the solid obtained from the solution; this separation is preferably carried out by filtration (filter press). A very pure salt (>99%) is thus obtained, which is the third product of the process.

The remaining sulfuric solution mainly contains manganese (II) and (III) sulfates, the non-precipitated residue of zinc sulfate, potassium sulfate and sulfuric acid.

In the next step, g), the sulfuric solution separated in step f) is subjected to electrolysis, obtaining the formation at the anode of the manganese (IV) oxide, $MnO_2$. The cell, thermostated at 50° C., and with platinum electrodes, has a consumption of about 4 kWh per kg of $MnO_2$ produced.

The $MnO_2$ thus recovered, known in the industry as "Electrolytic Manganese Dioxide" or its abbreviation EMD, is a high-purity material that can be recycled to produce new batteries.

Finally, the sulfuric solution recovered after the electrolysis of step g) is returned to step c).

In a preferred embodiment, the process of the invention comprises one or more of the following additional and optional steps which further increase the effectiveness of recovery of the chemical components of black paste.

A first possible step is step b'), which can be carried out in parallel to the process and without any temporal relation (or execution order) with respect to the other operations of the process itself. In this step b'), the aqueous solution separated after step b), containing potassium hydroxide, is treated with carbon dioxide, which may result for example from the flue gas of the carbon residues of black paste; from the so treated solution, after concentration thereof, potassium carbonate ($K_2CO_3$) is obtained which can be used in further process steps, as described hereinafter.

A second possible additional step, f'), consists in recirculating the sulfuric solution separated in step f) to step c), i.e. to the sulfuric acid addition step. In this way, the sulfuric solution is conveyed to electrolysis only after the build-up of chemical components resulting from two or more charges of black paste in the process. The object is to obtain the enrichment of the solution in manganese sulfates which is then separated in step f) and sent to electrolysis in step g), to obtain a higher yield in $MnO_2$ in the latter.

Another optional step, g'), consists in the treatment with further oxalic acid of the solution recovered after step g) in which EMD has formed, to complete the precipitation of zinc residues, recovering by physical separation a further amount of zinc oxalate which is added to that recovered in step f). Zinc oxalate can be sold as raw material in the chemical industry.

The potassium carbonate produced in step b') can be added, in a further optional step h), to the solution resulting from steps g) or g'), resulting in the precipitation of manganese (II) carbonate ($MnCO_3$), which precipitates as a solid, and of further potassium sulfate. The manganese (II) ion forming the carbonate is that residual from the electrolysis step: it is known that the electrolysis operations are never lengthened until completion, because in the latter stages thereof, when the reagent species reaches low concentrations, the efficiency of the electrolytic discharge reaction of the desired species decreases drastically, electricity consumption increases considerably and parasitic reactions are established. After precipitation, $MnCO_3$ is physically separated (e.g. by filtration) and the resulting solution is concentrated to recover potassium sulfate, which can be sold for the production of fertilizers for agriculture.

Finally, in one last possible optional step i), the solid residue of black paste separated from the sulfuric solution in step d) can be treated with the KOH solution obtained in step b), or with the solution of potassium carbonate produced in step b'), to neutralize this residue before drying it for sale.

The invention will be further described in the following experimental section.

EXAMPLE 1

This example relates to a complete treatment process of black paste resulting from alkaline batteries.

140 kg of alkaline batteries from the recovery of dead batteries are treated. After sorting, separation by type, treatment of the integrated system with cutting, deferrization (i.e. separation of the iron part using magnets) and screening (specially to remove fragments of plastics), the crude black paste is subjected to washing with 750 L water (step b)). A suspension is formed, which is separated by filtration in an aqueous solution of KOH, yielding 114 kg of wet black paste; on this material, with a measurement using a Sartorius thermobalance, a moisture content equal to about 31.6% (equivalent to 78 kg of dry black paste) is determined.

A chemical analysis is carried out on a small part of this black paste by atomic emission spectroscopy with ICP source. The following results are obtained for the concentrations of the main elements:

Zn: 25.6%;
Mn: 30.5% (total manganese, all oxidation states);
K: 0.77%;
C: 7%.

The wet black paste obtained in the previous step is treated with 1500 L of an aqueous solution of $H_2SO_4$ at a concentration of 8% by weight (step c)).

The suspension thus obtained is filtered (step d)).

A new (sulfuric) solution and a new solid residue are obtained.

The sulfuric solution obtained in the previous step is treated with 20 kg of oxalic acid dihydrate (step e)); the formation of 54 kg of a precipitate is observed, which is separated by filtration from the supernatant solution (step f)).

The resulting solid consists of wet zinc oxalate and, upon an analysis with a thermobalance of a sample of the same, it results constituted by about 44.7% moisture, equal to 24.1 kg of water; by difference, it is noted that the solid contains an amount of anhydrous zinc oxalate equal to 29.9 kg.

The liquid phase separated in step f) is subjected to electrolysis (step g)), obtaining the formation of the 1a anode of 4.37 kg manganese (IV) oxide, $MnO_2$. The cell, thermostated at 50° C. and using platinum electrodes, has a consumption of about 4 kWh per kg of $MnO_2$ produced.

The invention claimed is:

1. A process of chemical treatment of black paste resulting from opening alkaline or zinc-carbon batteries or mixtures thereof, comprising the following steps:
   a) longitudinally cutting zinc-carbon or alkaline batteries or mixtures thereof dividing each of said batteries in two halves and passing the two halves thus obtained on a vibrating screen, causing leakage and selective dry extraction of the black paste;
   b) washing the black paste with water to separate potassium hydroxide of the alkaline batteries and ammonium chloride of zinc-carbon batteries in the form of a solution, and recovering a black paste fraction that is insoluble in water;
   c) treatment of the black paste fraction insoluble in water resulting from step b) with an aqueous solution of sulfuric acid, achieving the solubilisation of metallic zinc and of its compounds and of manganese compounds, and the salification of a residual potassium hydroxide with the formation of potassium sulfate;
   d) separating an insoluble residue of black paste consisting of manganese dioxide and carbon from the aqueous solution of sulfuric acid;

e) treating the aqueous solution of sulfuric acid obtained in step d) with oxalic acid in sub-stoichiometric amounts compared to zinc, obtaining the precipitation of zinc oxalate;
f) separation of zinc oxalate from the aqueous solution of sulfuric acid;
g) electrolysis of the aqueous solution of sulfuric acid with formation of $MnO_2$ at an anode.

2. The process according to claim 1, wherein in step b), 500 to 1000 liters of water are used per 100 kg of black paste.

3. The process according to claim 1 wherein, per 100 kg of starting black paste, in step c), 1200 to 2000 liters are used of an aqueous solution of sulfuric acid having a concentration of between 5 and 15% by weight.

4. The process according to claim 1, further comprising a further step b'), consisting in treating the aqueous solution separated after step b) with carbon dioxide, forming potassium carbonate ($K_2CO_3$).

5. The process according to claim 1, further comprising a further step f'), consisting in recirculating to step c) the aqueous solution of sulfuric acid separated in step f), obtaining the enrichment in manganese sulfates of the solution to be conveyed to electrolysis in step g).

6. The process according to claim 1, further comprising a further step g'), consisting in treating the solution recovered after step g) with further oxalic acid, to complete the precipitation of zinc residues.

7. The process according to claim 4, further comprising a further step h), consisting in adding the potassium carbonate produced in step b') to the solution resulting from steps g), obtaining the precipitation of manganese (II) carbonate ($MnCO_3$).

8. The process according to claim 1, further comprising a further step i), wherein the insoluble residue of black paste obtained in step d) is treated with the potassium hydroxide solution obtained in step b).

9. The process according to claim 2, wherein in step b), 700 to 800 liters of water are used per 100 kg of black paste.

10. The process according to claim 3 wherein, per 100 kg of starting black paste, in step c), about 1500 liters of said aqueous solution of sulfuric acid are used.

11. The process according to claim 3 wherein said aqueous solution of sulfuric acid has a concentration of about 8% by weight.

12. The process according to claim 4, further comprising a further step g'), consisting in treating the solution recovered after step g) with further oxalic acid, to complete the precipitation of zinc residues.

13. The process according to claim 12, further comprising a further step h), consisting in adding the potassium carbonate produced in step b') to the solution resulting from step g'), obtaining the precipitation of manganese (II) carbonate ($MnCO_3$).

14. The process according to claim 4, further comprising a further step i), wherein the insoluble residue of black paste obtained in step d) is treated with the potassium carbonate obtained in step b').

* * * * *